INVENTORS
JACK C. BOKROS
JACK CHIN
ROBERT J. PRICE
ATTORNEY

United States Patent Office 3,547,676
Patented Dec. 15, 1970

3,547,676
PYROLYTIC CARBON STRUCTURES AND
PROCESS FOR MAKING SAME
Jack C. Bokros, Jack Chin, and Robert J. Price, San
Diego, Calif., assignors to the United States of America as represented by the United States Atomic Energy
Commission
Filed Feb. 15, 1966, Ser. No. 529,181
Int. Cl. C23c 9/06, 13/04
U.S. Cl. 117—46                                 10 Claims

ABSTRACT OF THE DISCLOSURE

An article is heated to a high temperature in contact with a gas stream carrying a carbon containing substance with the heating, flow rate and size of the articles controlled to deposit a dense isotropic pyrolytic crystalline carbon on the surfaces of the articles. The deposited carbon, per se, having an isotropic crystalline structure, a density of at least 1.8 grams per cc., and a Bacon anisotropy factor between about 1.0 and 1.3 has good mechanical strength and excellent dimensional stability under prolonged exposure to high temperature and neutron irradiation.

---

The invention described herein was made in the course of, or under, Contract AT(04-3)-167, Project Agreement No. 12.

This invention relates to processes for making pyrolytic carbon and the pyrolytic carbon structures which result therefrom. More particularly, it relates to processes for depositing pyrolytic carbon which has excellent mechanical strength and structural stability although exposed to high temperatures and high-level fast neutron irradiation for prolonged periods.

Pyrolytic carbon which has good structural strength at high temperatures and which is structurally stable although exposed to high-level neutron irradiation for a prolonged period has various uses in the field of nuclear energy. For example, nuclear reactor fuel particles of fissile and/or fertile materials may be coated with pyrolytic carbon to retain volatile fission products within the confines of the coatings.

Other materials such as neutron absorbers or poisons, which are often employed within nuclear reactors for various purposes, may be provided with good high temperature and neutron irradiation stability by coating with pyrolytic carbon. Moreover, mandrels may be coated with pyrolytic carbon to provide massive pyrolytic carbon deposits.

One example of a coated particle suitable for use in various nuclear energy applications is disclosed in U.S. patent application, Ser. No. 272,199, filed Apr. 11, 1963 in the names of Walter V. Goeddel and Charles S. Luby which issued as U.S. Pat. No. 3,325,363 on June 13, 1967. In this copending application, a nuclear fuel particle is disclosed which comprises a central core having a first coating of a low density, spongy, shock-absorbing pyrolytic carbon thereon which is capable of absorbing thermal stresses and attenuating the fission recoils which occur when a nuclear fuel core is employed. This spongy carbon coating is surrounded with a dense retentive exterior coating. Various types of dense, thermally conductive pyrolytic carbon outer coatings are disclosed, including ones which are employed in conjunction with an interior intermediate layer of a material such as silicon carbide, zirconium carbide or niobium carbide. Dense pyrolytic carbon structures having even better structural strength and high temperature stability are desired.

It is a principal object of the present invention to provide pyrolytic carbon structures having excellent mechanical strength and structural stability although subjected to high temperature operation and high-level neutron irradiation for long periods of time. It is another object to provide a process for making pyrolytic carbon which has excellent structural strength even though exposed for prolonged periods to high temperatures and to high density neutron irradiation. A further object is to provide pyrolytic carbon structures having excellent dimensional stability when exposed to a high dose of high energy neutron irradiation for prolonged periods of time. Still another object is to provide a process for economically depositing pyrolytic carbon having the aforementioned characteristics. These and other objects of the invention are more particularly set forth in the following detailed description of processes and products embodying various features of the invention and in the accompanying drawings wherein:

Figure 1:
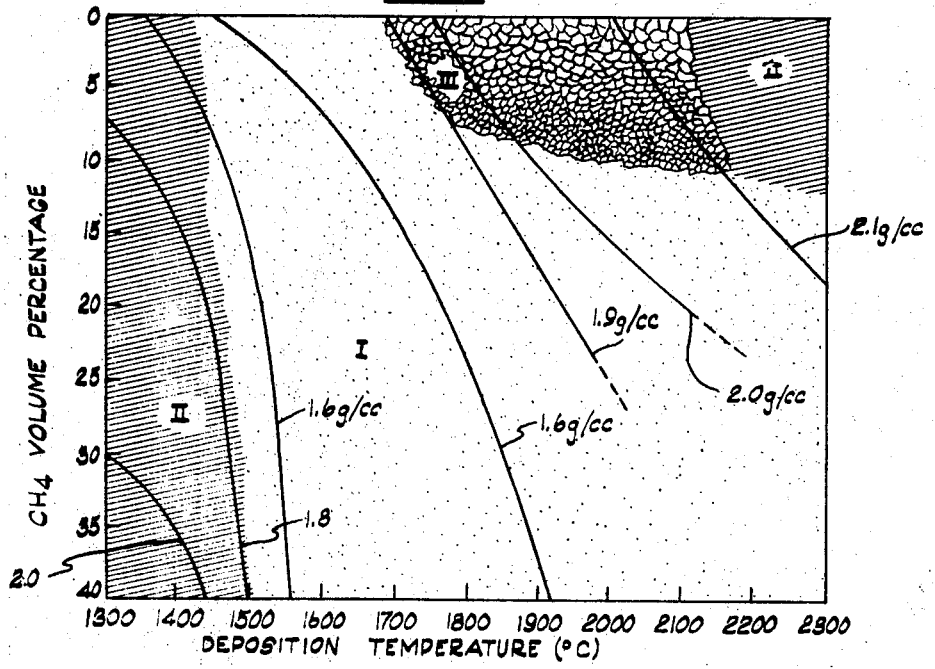
FIG. 1 is a graphic illustration of the physical properties of pyrolytic carbon deposited in a fluidized bed of 3.8 cm. internal diameter from a methane-helium mixture at a contact time of about 0.1 second and an initial total deposition surface area of about 1000 sq. cm.

In general, the present invention provides dense, isotropic pyrolytic carbon structures and processes by which such structures can be economically deposited. Compared to other forms of pyrolytic carbon, it is believed that dense isotropic carbon can accommodate the largest elastic strain before fracturing and has far superior dimensional stability when subjected to irradiation with fast neutrons.

Although much of the following description is generally directed to coated particles, especially those containing nuclear fuel or neutron poisons, it should be understood that the invention has various non-nuclear uses, especially in operations wherein high-temperature stability is of importance.

For example, massive pyrolytic carbon structures of dense isotropic carbon are especially suitable for non-nuclear uses, such as crucibles, nose cones, etc.

The parameters of the pyrolytic carbon deposited are generally dependent upon the desired use of the product. If the pyrolytic carbon structure is used to coat articles, such as particles of nuclear fuel material, the parameters of the carbon deposited are dependent upon the particular application which will be made of the finished particles. Coated articles which are covered with a jacket of dense isotropic pyrolytic carbon are more particularly described in pending U.S. application, Ser. No. 502,702, filed Oct. 22, 1965 in the names of Jack C. Bokros, Walter V. Goeddel, Jack Chin, and Robert J. Price which issued as U.S. Patent No. 3,298,921 on Jan. 17, 1967. It is also noted that the deposition of massive isotropic pyrolytic carbon is described in detail in copending U.S. application, Ser. No. 526,603, filed Feb. 10, 1966 in the names of Jack C. Bokros, Jack Chin and Alan S. Schwartz which issued as U.S. Pat. No. 3,399,969 on Sept. 3, 1968.

The substrate upon which the isotropic pyrolytic carbon structure is deposited may be any suitable material which is stable at the relatively high temperature at which thermal decomposition takes place, e.g. above about 1800° C. If the substrate is to be an integral part of the resultant product, as in the case of coating cores of nuclear fuel particles, then of course the particular substrate chosen is determined by the desired end use of the product. If the substrate is unimportant, as particularly in the case of a deposit of massive pyrolytic carbon upon a mandrel which will be subsequently removed, then any inexpensive substrate, such as commercial dense graphite, may be employed.

It has been found that dense pyrolytic carbon which is isotropic has excellent mechanical strength and dimensional stability although exposed to fast neutron irradiation qualities. The measure of whether a carbon structure is isotropic may be determined using X-ray diffraction from which the variations in the intensity of the X-rays diffracted from the layer planes may be used to calculate its Bacon anisotropy factor. The Bacon anisotropy factor is an accepted measure of preferred orientation of the layer planes in the carbon structure. The technique of measurement and a complete explanation of the scale of measurement is set forth in an article by G. E. Bacon entitled "A Method for Determining the Degree of Orientation of Graphite" which appeared in the Journal of Applied Chemistry, volume 6, page 477 (1956). For purposes of this application, the term "isotropic carbon" is defined as carbon which measures between 1.0 (the lowest point on the Bacon scale) and about 1.3 on the Bacon scale.

For isotropic pyrolytic carbon to exhibit the desired physical properties of good mechanical strength and structural stability under neutron irradiation, it should be deposited under conditions so it will be dense. The dimensional stability under neutron irradiation increases with increasing density. In general the deposition conditions should be regulated so that the density of the isotropic carbon is as close to theoretical as possible, which is 2.21 grams per cc., and at least about 1.8 grams per cc. It should be understood that the desired density of the isotropic carbon is a function of its application. The higher the expected neutron irradiation dose the higher the density of the isotropic carbon needed to maintain stability. Therefore for a relatively low neutron irradiation dose, isotropic carbon having a density of about 1.8 grams per cc. performs satisfactorily, while carbon having a density of about 2.0 or greater should be employed for higher neutron irradiation doses to achieve the same results.

Dense isotropic pyrolytic carbon, as defined above, has good thermal conductivity which is substantially equal in the direction parallel to the planes of deposition and in the direction perpendicular thereto. Such pyrolytic carbon is also characterized by relatively high fracture strain and fracture stress. Moreover, dense nearly isotropic pyrolytic carbon shows a dimensional change of less than about 3% after subjection to neutron irradiation totaling $2.4 \times 10^{21}$ nvt (E>0.18 mev.) at about 1040° C.

In addition to the foregoing considerations, the crystallite height or apparent crystallite size of the isotropic carbon should be as high as possible, the range between about 100 to about 200 angstroms is satisfactory. The apparent crystallite size, herein termed $L_c$, can be measured using an X-ray diffractometer. In this respect $$L_c = \frac{0.89\lambda}{\beta \cos \theta} A$$

wherein:

$\lambda$ is the wave length in angstroms;
$\beta$ is the half-height (002) line width, and
$\theta$ is the Bragg angle.

It has been found that isotropic pyrolytic carbon having a crystallite size in excess of 100 A. has satisfactory stability under high-level neutron irradiation. It is believed that dense isotropic carbon in this crystallite size range is more resistant to damage resulting from continued neutron bombardment than carbon with smaller crystallite size and thus is particularly well suited for applications wherein the carbon will be subjected to a high neutron flux environment, as in the core of a nuclear reactor.

Figure 6:
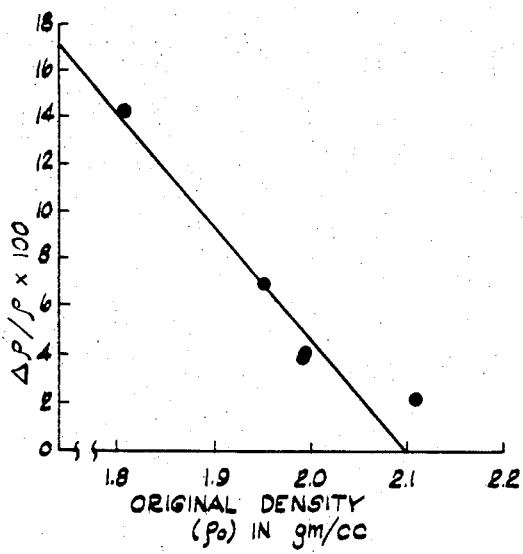
FIG. 6 is a graph showing the change in density which occurs in pyrolytic carbon structures upon subjection to neutron irradiation, at about 1040° C., totaling $2.4 \times 10^{21}$ nvt (using neutrons having energy greater than 0.18 mev.)

It has been found that there is a direct relationship between the density of a pyrolytic carbon structure and the resistance which the structure has to change upon subjection to neutron irradiation. FIG. 6 illustrates this relationship and shows that pyrolytic carbon having a higher density undergoes a lesser percentage change in density upon exposure to neutron irradiation than one of lower initial density. This graph illustrates that pyrolytic carbon structures of relatively low initial densities shrink considerably in volume, and thus change dimensionally, when exposed to substantial fast neutron irradiation. An increase in density results from this volume decrease.

Figure 7:
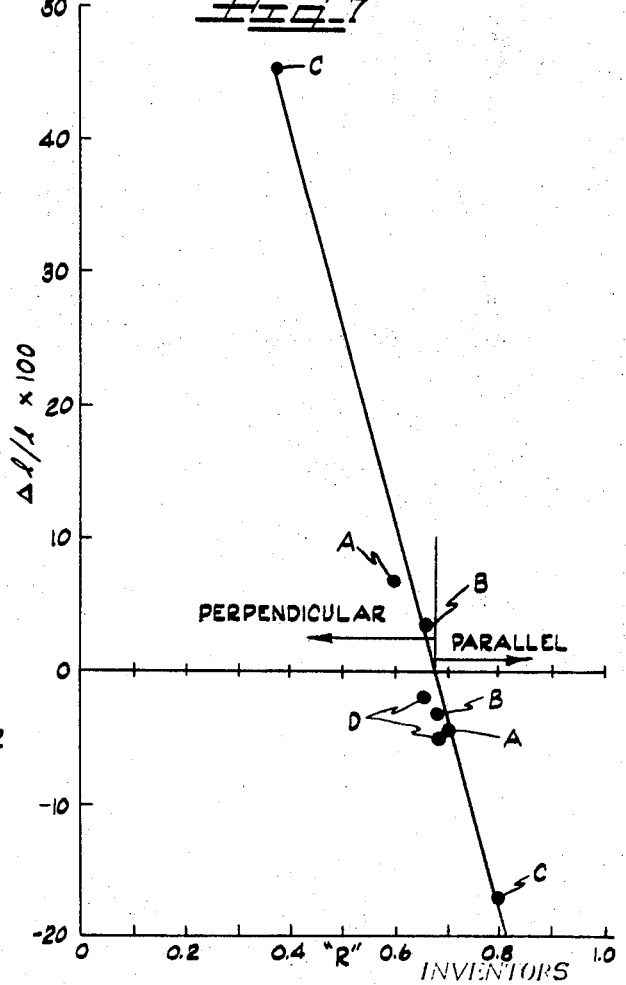
FIG. 7 is a graph showing the dimensional changes which occur in pyrolytic carbon structures subjected to the neutron irradiation specified with respect to FIG. 6, as a function of the degree of anisotropy of the pyrolytic carbon structure.

It has also been discovered that the dimensional changes which occur in pyrolytic carbon structures of approximately equal densities vary as a result of the preferred orientation of the crystalline structure of the pyrolytic carbon. This relationship is shown in FIG. 7 wherein a graph illustrates the percentage change in dimensions versus the R value of the pyrolytic carbon structure. The R value is a measure of the anisotropy value of the structure and is related to the Bacon anisotropy factor. The R value is dependent upon the plane of examination; two interdependent expressions are necessary to define the R value, one for the direction perpendicular to the plane of deposition:

$$R\perp = \frac{2}{BAF+2}$$

and another showing the measure of anisotropy in the parallel direction:

$$R\| = 1 - \frac{R\perp}{2}$$

Accordingly, a purely isotropic structure is represented by a value of 0.667 (⅔) on the R scale. As shown in FIG. 7 values of R below 0.667 (⅔) correspond to a measure of anisotropy in the perpendicular direction and those above 0.667 (⅔) to the parallel direction. A purely anisotropic structure is represented by R values of 0.0 and 1.0, a 0.0 value of R corresponds to the perpendicular direction and means that none of the crystal $a$ axis are oriented in this direction, while a value of 1.0 for R corresponds to the parallel direction in which all the crystal $a$ axis are oriented.

The values for the points plotted in FIG. 7 are obtained by depositing pyrolytic carbon upon small graphite disks, which disks were included in a fluidized bed coater together with a quantity of 300 to 400 micron diameter particles. The small graphite disks are circular, having a diameter of about 7 mm. and a thickness about 1.0 mm. In each instance, a deposit of pyrolytic carbon about 100 microns thick is deposited on the particles and on the disks. Pyrolytic carbon, specimens about 6 mm. long, about 1.0 mm. wide and about 0.1 mm. thick are stripped from the disks. The specimens are tested for mechanical strength and are subjected to neutron irradiation of $2.4 \times 10^{21}$ nvt ($E > 0.18$ mev.) to measure the dimensional change which results.

Points A on FIG. 7 indicate that isotropic pyrolytic carbon having a density of about 2.0 gm./cc. and a Bacon anisotropy factor of about 1.3 has a dimensional decrease in the direction parallel to the planes of deposition of about 5% and an increase in the direction perpendicular thereto of about 6.5%. Points B on FIG. 7 indicate that a granular pyrolytic carbon structure of a density of about 2.0 gm./cc. and a Bacon anisotropy factor of about 1.1 undergoes an increase of about 4% in the direction perpendicular to the planes of deposition and a decrease of about 4% in the direction parallel to the planes of deposition. Points C on the graph illustrate that laminar pyrolytic carbon of a density of about 2.1 gm./cc. but having an Bacon anisotropy factor of about 3.5 undergoes an increase in the direction perpendicular to plane of deposition of about 45% and a decrease in the direction parallel thereto of about 19%. Points D on the graph illustrate that isotropic pyrolytic carbon having a density of about 1.8 and a Bacon anisotropy factor of about 1.1 shows a 2% decrease in the direction perpendicular to the planes of deposition and a 5% decrease in the direction parallel thereto. Furthermore, the data predict no dimensional change for a fully dense carbon that is perfactly isotropic, that is having a value of R of 0.667 (BAF=1.0).

When pyrolytic carbon is irradiated by fast neutrons, the individual crystallites change shape, expanding in the (002) direction and contracting in directions parallel to the (002) planes. In addition, if the density of the pyrolytic carbon structure is relatively low, the structure undergoes an overall increase in density as a result of fast neutron irradiation, as illustrated in FIG. 6. In a purely isotropic pyrolytic carbon structure wherein the crystallites are randomly oriented with respect to one another, the expansions and contractions referred to above statistically cancel one another on a microscale. Accordingly, isotropic pyrolytic carbon of fairly high density and a Bacon anisotropy factor between about 1.0 and 1.3 can be expected to exhibit good irradiation stability.

The dimensional changes illustrated in FIG. 7 are measured upon pyrolytic carbon specimens removed from the substrates upon which they were deposited. If the irradiation is carried out upon the composite articles of substrate plus pyrolytic carbon coating, restraint will be exerted upon the pyrolytic carbon structure which will reduce the amount of dimensional change and accommodate this as a creep strain within the pyrolytic carbon structure. Comparable irradiation of a coated disk of the same composition as the specimen samples which are plotted as points A on FIG. 7 shows that about 3% strain occurs, which strain is fully accommodated within the pyrolytic carbon structure by what is believed to be a combination of creep and elastic deformation. As a result, no cracking of the pyrolytic carbon structure occurs. Accordingly, a pyrolytic carbon structure having these parameters is considered to have good irradiation stability.

Although from FIG. 7 it can be seen that various of the properties of the dense granular pyrolytic carbon are comparable to those of the dense isotropic carbon, there is a substantial difference in the economics of producing these carbon structures. Although processes for depositing pyrolytic carbon are disussed more fully hereinafter, it can be generally stated that the total amount of surface area upon which isotropic carbon can be deposited, in a given coater, may exceed that upon which comparable granular pyrolytic carbon can be deposited by a factor of at least 2 times. In addition, the rate of deposition of isotropic carbon may exceed the rate of deposition of granular carbon by a factor of at least 2, as is partially evident from FIG. 2. Therefore, in the coater total production rate of isotropic carbon exceeds that of granular carbon by at least a factor of 4. Since coating is a batch process and a large portion of the total coating operation time is expended loading/unloading and heating/cooling the coater, on the order of about 15 percent of the total time of the coating operation, the larger the batch size the more economical the coating operation. This coater down time factor further illustrates the economical advantage of the isotropic over the granular carbon. Therefore, it can be seen, considering the aforementioned factors that there can be a significant difference in the cost of production of the isotropic and granular structure.

In most instances, it is desirable that the pyrolytic carbon should be uniformly deposited upon the substrate. If the pyrolytic carbon is to be deposited as a coating on small patriculate materials, to assure that the particles are uniformly coated they are maintained in motion during the deposition. Motion of the particles being coated may be conveniently accomplished in a fluidized bed coater or in a rotating drum coater, either of which provides a suitable enclosure wherein the particles can be maintained in motion while exposed to a passing gas stream. The preferred method of coating small articles with isotropic carbon is by deposition of pyrolytic carbon by high-temperature decomposition in a fluidized bed.

It was surprising that crystalline, high density isotropic carbon could be deposited by pyrolytic decomposition. Previous work in this field led to the supposition that conditions under which it might be possible to deposit randomly oriented carbon would also lead to low density deposits. The crystalline structure and the density of the pyrolytic carbon that is disposed by the thermal decomposition of a vaporous carbon-containing substance are dependent upon several interdependent variable operating conditions of the coating apparatus being used. These conditions include the temperature of the substrate upon which deposition is occurring, the partial pressure of the vaporous carbon-containing substance being used, the total deposition surface area in the region wherein deposition is occurring in the coating apparatus, the contact time (the average time in which the individual molecules of the carbon-containing substance are in the active deposition region of the coating apparatus), and the particular overall composition of the atmosphere from which deposition is occurring. The interdependence of these variables is discussed in detail hereinafter and is illustrated in various of the graphs.

Any suitable carbon-containing substance which can be decomposed at high temperature to deposit pyrolytic carbon upon a heated substrate may be employed. This category may be taken to include both substances which are in gaseous form at room temperature and those which are not gaseous at room temperature but which can be vaporized at a temperature lower than that at which the thermal decomposition occurs. It is believed that the hydrocarbon gases of relatively low carbon chains, such as butane and below, are the most convenient to employ, and gaseous hydrocarbons are preferred. Methane appears to be especially well suited for use in fluidized bed coating operations; and accordingly, a mixture of methane and an inert gas, such as helium, argon or nitrogen, is the most prefererd composition of the gas stream.

The conditions under which isotropic pyrolytic carbon is deposited from a methane mixture, under certain specific operating conditions hereinafter enumerated, are shown in FIG. 1. FIG. 1 depicts the structure and density of carbon deposited under various combinations of methane concentration and deposition temperature for an initial total deposition surface of about 1000 sq. cm., a contact time of about 0.1 second and a total pressure of one atmosphere.

In the area of the graph labeled I, isotropic carbon is deposited. In the areas labeled II, both at the left-hand side and at the upper right-hand corner of the graph, anisotropic carbon having a crystalline structure termed "laminar" is deposited. In the area labeled III, at the upper center of this graph, a crystalline structure of dense pyrolytic carbon is deposited which is tremed "granular." As used in this application, these different carbon structures are defined as follows:

(1) Laminar carbon is that which possesses layer planes which are preferentially oriented parallel to the surface of the substrate, possesses a broad range of apparent crystallite sizes, has a density ranging from 1.5 to 2.2 g./cc., and whose microstructure, when viewed metallographically under polarized light, is optically active and shows the typical "cross" pattern.

(2) Isotropic carbon is that which possesses very little preferred orientation, having a broad range of apparent crystallite sizes, a density which may vary from 1.4 to 2.2 g./cc., and whose microstructure, when viewed metallographically under polarized light, is not optically active and is featureless.

(3) Granular carbon is that which is usually slightly oriented having a density in the vicinity of 2.0 to 2.1 g./cc. and relatively large apparent crystallite sizes and whose microstructure, when viewed metallographically under polarized light, contains discrete grains.

Of course, the other operational variables hereinbefore mentioned, also affect the crystalline structure of the carbon deposited. In this respect FIG. 1 is based upon a surface area (initial) of about 1000 square centimeters in a 3.8 cm. diameter fluidized bed coater wherein the deposition takes place in a region about 5 inches (12.7 cm.) high and upon a contact time of the gas stream with the fluidized bed of about 0.1 second. Generally, any substantial change in the values of these two variables can result in some shifting of the boundaries between areas I, II, and III, as shown in FIG. 1. This is discussed hereafter.

Although from the graph, it may appear that the boundaries between areas I, II, and III are well-defined lines of demarcation, in actuality it should be realized that this is not the case. In general, the transformation from one crystalline structure to another in the general region of the boundary therebetween is somewhat gradual so that it might be properly said that one crystalline structure grades into the other. Moreover, it should be realized that although isotropic carbon is produced under the deposition conditions for area I of the graph, the other properties, such as density and crystallite height, vary within the different portions of area I and are likewise dependent upon the other variables such as bed surface area and contact time. Various lines of equal density are shown on FIG. 1.

As previously mentioned, dense isotropic pyrolytic carbon can be economically deposited from higher methane concentrations under operating conditions wherein there is a relatively large total surface area for deposition, relative to the volume of the particular region of the enclosure wherein deposition is occurring. Rates of deposition of pyrolytic carbon as a function of methane concentration are plotted in FIG. 2, which are based upon a fluidized bed coater of 3.8 cm. diameter, operating at a deposition temperature of about 2100° C., a methane-helium mixture of one atmosphere total pressure, a contact time of about 0.1 second and initial total deposition surface areas of about 800, 1000, 2000, and 3000 sq. cm.

Figure 2:
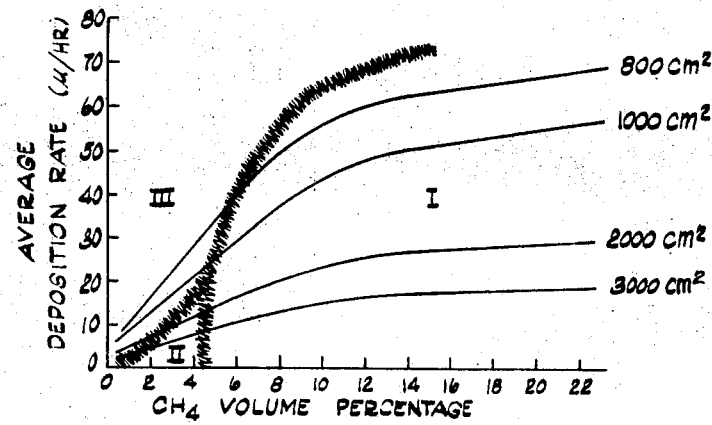
FIG. 2 is a graph illustrating the rate of pyrolytic carbon deposition as a function of methane concentration of a methane-helium mixture which occurs in a 3.8 cm. fluidized bed coater having initial total deposition surface areas as enumerated, operating at 2100° C., and a flow rate such that the contact time is about 0.1 second.

Also shonw in FIG. 2 is the type of carbon deposited for the aforementioned conditions. Generally, isotropic carbons are deposited from high methane concentrations but may be deposited at lower methane concentrations provided that the bed surface area is sufficiently large as shown by region I in FIG. 2. However, should the bed surface area become very large the layer planes begin to develop a preferred orientation as shown in region II of FIG. 2. The granular carbon deposits are favored when the methane concentration and bed surface area are small as reflected by region III of FIG. 2. The average deposition rate (measured in microns per unit of time) varies inversely with bed surface areas, that is lower deposition rates result when the bed surface area is increased, and varies directly as methane concentration, that is higher deposition rates result from increased methane concentration. For the same bed surface area 1000 sq. cm. and deposition temperature, 2100° C., isotropic carbon from a 15 percent methane concentration is deposited at about three times the rate of the granular carbon from a 3 percent methane concentration. Larger surface areas favor isotropic rather than the granular carbon which, despite the fact that the deposition rate decreases with increasing surface area, is advantageous from a production standpoint. A substantial percentage, on the order of about 15 percent, of the total coating operation is taken up by loading and unloading the particles and heating and cooling the coater and therefore the larger the batch size the more economical the overall operation. For example, doubling the bed surface area from 1000 sg. cm. to 2000 sq. cm. at a methane concentration of 15 percent reduces the deposition rate by about a factor of two, therefore, even though the time for carbon to deposit is the same the total operation is faster for the larger bed surface area as one load/unload and heat/cool cycle is eliminated.

At fairly high temperatures and relatively low values of total deposition surface areas, and methane concentrations, dense granular carbon is formed (area III, FIG. 1). Whereas granular carbon has various physical properties which compare favorably with those of dense isotropic carbon, such as good heat conductivity, and resistance to neutron irradiation-induced dimensional changes, granular pyrolytic carbon cannot be deposited under conditions economically comparable to those which produce dense isotropic carbon nor does the granular carbon have the mechanical strength of the isotropic carbon.

Figure 3:
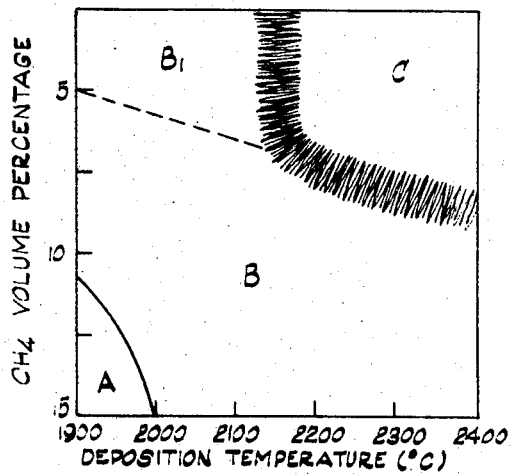
FIG. 3 is a graphic illustration showing the transition from one crystalline form of pyrolytic carbon to another caused by variation in the total deposition surface area, the methane concentration, and the deposition temperature for a contact time of about 0.05 sec.

FIG. 3 illustrates the conditions with regard to surface area at a contact time of about 0.05 second in a 3.8 cm. diameter fluidized bed coating apparatus having a 5 inch high deposition region, wherein the crystalline structure of the pyrolytic carbon deposited varies between isotropic, granular and laminar. A minimum bed surface area to void volume of the deposition region ratio of five to one exists for all conditions shown in FIG. 3. In the area A of the lower left-hand corner of FIG. 3, isotropic carbon is deposited for all bed surface areas up to about 5000 cm.$^2$. At a value of about 5000 cm.$^2$ the carbon deposited begins to develop a preferred orientation, and becomes more oriented as the bed surface area is increased even higher. In the central area B of FIG. 3, granular carbon is deposited at low bed surface areas, with a transition of the deposit to isotropic carbon and then a subsequent transition to laminar occurring with increasing bed surface area. For the lower deposition temperatures and low methane concentrations on the order of about 5 percent or less, transition from granular to isotropic carbon occurs only when bed surface areas are in excess of about 3000 sq. cm. In area B$_1$, the transition from granular to isotropic occurs at about 4000 cm.$^2$ or above, and the subsequent transition from isotropic to laminar occurs only in excess of about 5000 cm.$^2$. At the higher methane concentration, a bed surface area on the order of only about 1100 sq. cm. is required before the deposit changes from granular to isotropic, and the subsequent transition from isotropic to granular may occur as low as about 4000 cm.$^2$. The carbon deposited at high deposition temperatures and low methane concentrations (area C) is oriented at all values of surface area, and as area increases so does the degree of orientation. It should be noted that under certain conditions, which include even larger bed surface areas the laminar carbon deposited develops a degree of increasing orientation. As a result of increasing bed surface area, the transition would be from granular to isotropic to laminar. Therefore, in FIG. 3 the three generalized regions reflect the microstructure transitions which occur with increasing bed surface area, which are (A) isotropic to laminar, (B) granular to isotropic to laminar and (C) laminar. When the carbon deposited becomes oriented, it becomes unsuitable for exposure to high neutron irradiation of high energy ($E > 0.18$ mev.).

In a fluidized bed coating apparatus, it should be realized that as the pyrolytic carbon being deposited coats the particles and increases the size thereof, the total area of available deposition surface accordingly increases. Therefore, if the initial bed area is near the approximate transition value it can be seen that although the pyrolytic carbon deposited will initially be granular in form, there may be a transition from the isotropic form as deposition continues. This graph also illustrates the considerable dependence of the structure on the relative surface area available.

As hereinbefore stated, to assure good irradiation stability, the pyrolytic carbon should have a relatively high density, i.e., at least about 1.8 gm. per cc. For example, isotropic carbon of suitable density can be deposited using a bed temperature of at least about 2000° C. and a methane concentration of about 15 volume percent methane in a methane-helium mixture, when deposition is carried out using a bed surface area of about 1000 sq. cm. and a contact time of about 0.15 second in a coater 3.8 centimeters in diameter. Variation of any of these parameters within reasonable limits continues to provide dense pyrolytic carbon. The same density can be obtained in an isotropic carbon structure if a faster flow rate and a larger bed area are used, or at a faster flow rate and a higher temperature, all within limits, of course. In general, within reasonable limits, as discussed earlier, longer contact time and higher bed temperatures favor production of high density isotropic carbon.

Figure 4:
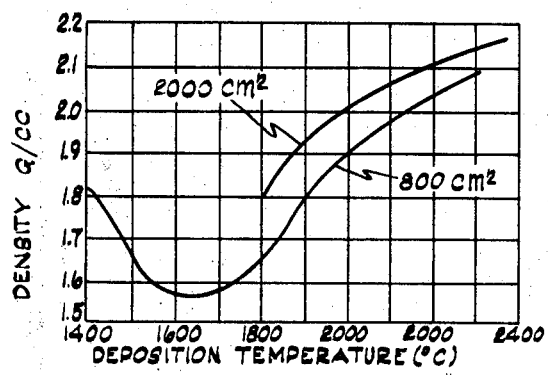
FIG. 4 is a graph of the deposition of pyrolytic carbon in a fluidized bed coater of 3.8 cm. diameter from a methane-helium mixture containing 20 volume percent methane and a contact time of 0.1 second, illustrating the effect which the change in total surface area of the deposition region has upon the density of the deposited carbon.

The effect of the relative surface area of the bed upon the density of the isotropic carbon deposited, under the conditions for which FIG. 1 is constructed, is shown graphically in FIG. 4. In this respect, it is believed that there is a minimum of threshold value for a given size coater below which isotropic carbon is not deposited. Although this value of course is different for different for different size coaters, it is believed that a general rule can best be expressed by comparing the total surface area to the volume of the region wherein deposition occurs. If the surface area is measured in sq. cm. and the volume in cubic cm., the surface area to volume ratio should be at least about 5 to 1.

The deposition surface area is calculated using the surface area of the articles being coated before deposition begins. Of course, it is realized that the surface area of a bed of small particles constantly increases as the articles upon which the carbon is being deposited grow larger in size. As pointed out with respect to FIG. 3, if the initial amount of relative surface area is near a transition boundary, transition to another crystalline form may occur. FIG. 4 shows that an increase in the total deposition surface area increases the density of the pyrolytic carbon which is deposited. However should the surface ever become too large, the deposit develops a preferred orientation, as was explained with respect to FIG. 3. It also slightly shifts the crystalline boundary lines seen in FIG. 1. Likewise, a decrease in the total deposition surface area results in a decrease in density of the isotropic pyrolytic carbon deposited.

Figure 5:
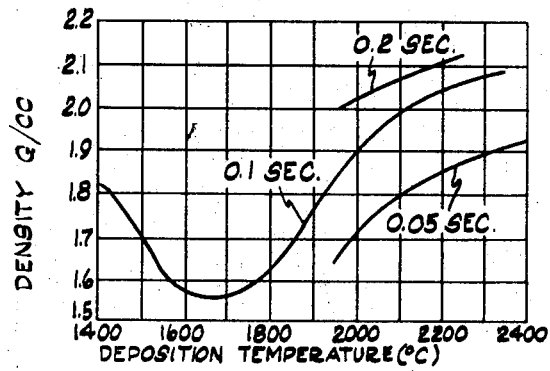
FIG. 5 is a graph of the deposition of pyrolytic carbon in a fluidized bed coater of 3.8 cm. diameter from a methane-helium mixture containing 20 volume percent methane and an initial total deposition surface area of 1000 sq. cm., illustrating the effect which change in contact time has upon density of the deposited carbon.

The effect of the contact time, or flow rate, of the hydrocarbon gas with the articles upon which deposition is taking place is shown in FIG. 5, using the same operating criteria for which FIG. 1 is constructed. The computation of contact time is accomplished by using the following relationship:

$$\text{Contact time} = \frac{\text{Fluid bed hot zone volume}}{\text{Rate of gas flow}}$$

The fluid bed hot zone volume is the volume of the hot zone less that space taken up by the mandrel and particles. The rate of gas flow is measured at the deposition conditions, the room temperature rate may be converted to deposition temperature rate using the direct relation of the temperature measured in degrees Kelvin, that is:

Rate at deposition conditions $$= \frac{T_{\text{deposition}}(°K)}{T_{\text{room}}(°K)} \times \text{Rate at room temperature conditions}$$

In general, the contact time is maintained between about 0.05 second and 0.3 second to achieve the deposition of dense isotropic carbon.

From FIG. 5, it can be seen that an increase in the contact time of the hydrocarbon gas mixture with the articles upon which deposition is taking place (as, for example, by reducing the flow rate of the gas mixture through the fluidized bed coating apparatus so that the gas molecules are in contact with the articles being coated for a longer period of time) serves to increase the density of the carbon being deposited, and it also slightly shifts the boundary lines seen in FIG. 1. Likewise, a decrease in the contact time decreases the density, other conditions being held constant.

The following examples illustrate several processes for producing pyrolytic carbon which point out various advantages of the invention. Although these examples include the best modes presently contemplated by the inventors for carrying out their invention, it should be understood that these examples are only illustrative and do not constitute limitations upon the invention which is defined by the claims which appear at the end of this specification.

EXAMPLE I

Particulate uranium dicarbide is prepared having a particles size of about 250 microns and being generally spheroidal in shape. The uranium used contains about 92% enrichment. A graphite reaction tube having an internal diameter of about 2.5 centimeters is heated to about 1100° C. while a flow of helium gas is maintained through the tube. When coating is ready to begin, the helium flow rate is increased to about 900 cc. per minute and a charge of 50 grams of the uranium dicarbide particles are fed into the top of the reaction tube. The flow of gas upward through the tube is sufficient to levitate the particles and thus create within the tube a fluidized particle bed.

When the temperature of the fuel particles reaches about 1100° C., acetylene gas is admixed with the helium to provide an upwardly flowing gas stream of the same flow rate but having a partial pressure of acetylene of about 0.80 (total pressure 1 atm.). The acetylene gas decomposes and deposits low density, spongy carbon upon the nuclear fuel particles. Under these coating conditions, the coating deposition rate is about 15 microns per minute. Flow of the acetylene is continued until a low density, spongy, pyrolytic carbon coating about 25 microns thick is deposited upon the fuel particles. Then the acetylene gas flow is terminated, and the particles are allowed to cool before their removal from this coating apparatus.

The coated charge of particles is then transferred to a larger reaction tube having an internal diameter of about 3.8 centimeters. This tube is heated to about 2100° C., while a flow of helium gas of about 7000 cc. per minute (standard temperature and pressure) is passed therethrough. Under these conditions, the contact time is about 0.2 second. When the tube reaches the desired temperature, the spongy carbon-coated charge of particles is fed thereinto. A sufficient quantity of these particles (about 45 grams of the coated particles), which now have diameters of about .300 microns, are fed into the reaction tube to provide a bed surface area of about 1000 cm.$^2$. When the temperature of the coated fuel particles reaches 2100° C., methane gas is admixed with the helium to provide the upflowing gas stream with a methane partial pressure of about 0.20 (total pressure 1 atm.), the total flow rate of gas remaining at about 7000 cc. per minute. The region in the tube is about 5 inches (12.7 cm.) high. The methane decomposes to deposit a dense isotropic pyrolytic carbon coating over the spongy carbon coating. Under these coating conditions, the carbon deposition rate is about 60 microns per hour. The methane gas flow is continued until an isotropic pyrolytic carbon coating about 85 microns thick is obtained. At this time the methane gas flow is terminated, and the coated fuel particles are cooled fairly slowly in helium and then removed from the reaction tube.

The resultant particles are examined and tested. The density of the outer isotropic carbon layer is found to be about 2.1 grams per cc. The Beacon anisotropy factor is found to be about 1.1 to 1.2. The apparent crystallite size is measured and found to be about 130 to 150 A.

This charge of coated particles is disposed in a suitable capsule and subjected to neutron irradiation at an average fuel temperature of about 1250° C. for about one month. During this time, the total fast-flux exposure is estimated to be about $10 \times 10^{20}$ nvt (using neutrons of an energy greater than about 0.18 mev.). As used in this application the term nvt should be understood to be in units of neutrons/cm.$^2$ as a result of measuring neutron density in neutrons/cm.$^3$, neutron velocity in cm./sec. and total duration of time in seconds. At the completion of this period, the burnup is estimated to be about 10 to 20 percent of the fissile atoms. The xenon-133 release fraction is less than about $1 \times 10^{-5}$. Moreover, the fuel particles with the isotropic pyrolytic carbon outer jacket exhibit no coating failures after about 10 to 20 percent burnup. This isotropic pyrolytic carbon structure is considered excellently suited for coating nuclear fuel particles to provide a fission product resistant jacket therefor.

EXAMPLE II

A charge of 200 micron diameter spheroidal particles of $UO_2$ is prepared having a density of about 8.0 g./cc., about 80% of theoretical maximum density. A charge of the particles having a total surface area of about 1200 sq. cm. is fed into a 3.5 cm. I.D. fluidized bed coater wherein the region where deposition occurs is about 5 inches (12.7 cm.) high. A plurality of small circular disks of graphite about 7 mm. in diameter and 1.0 mm. thick are included. When the bed temperature reaches about 2200° C. a methane-helium mixture is fed through the tube at atmospheric pressure using a methane partial pressure of about 0.15 and a total flow of about 10,000 cc./sec. which is equal to a contact time of about 0.1 second. The deposition rate is about 60 microns per hour. Deposition is continued until a 100 micron thick layer of isotropic pyrolytic carbon is obtained. At the end of this time, the methane flow is discontinued, and the bed is cooled and the disks and particles removed.

The density of the isotropic pyrolytic carbon deposited is about 2.05 grams per cm. The Bacon anisotropy factor is about 1.1. The apparent crystallite size is about 110 A. The xenon-133 releases factor of the particles for fast neutron irradiation under the conditions set forth in Example I is less than about $10^{-5}$. Burnup of approximately 10% of the fissile atoms causes essentially no coating failures.

Examination shows that the deposits on the disks are structurally identical to those on the particles. Testing of specimens which are carbon disks about 6 mm. in diameter and 0.1 mm. thick cut from the disks shows that the thermal conductivity is substantially uniform and equal to about $4 \times 10^{-2}$ cal./cm.-sec.-° C. Testing of the mechanical properties of the specimens shows that the isotropic pyrolytic carbon structures have a fracture stress of about $30 \times 10^3$ p.s.i. and elastic moduli of about $2 \times 10^6$ p.s.i. Exposure of the specimens to a total neutron irradiation of $2.4 \times 10^{21}$ nvt (E>.018 mev.) at about 1050° C. shows that there is less than 3% change in the direction either parallel to or perpendicular to the planes of deposition. The isotropic carbon deposited is considered to have excellent mechanical properties and to have excellent dimensional stability under neutron irradiation.

EXAMPLE III

Boron carbide spheroids having a particle size between about 300 and 420 microns are fed into a 3.8 cm. diameter fluidized bed coaster. A plurality of small graphite disks are included as in Example II. About 40 grams of these particles are used to provide an initial total surface area of about 2000 sq. cm. in the 5 inch (12.7 cm.) long reaction region. Isotropic pyrolytic carbon is deposited using a bed temperature of 2100° C., and a gas flow rate of about 5000 cm.$^3$/min. of a helium-methane mixture having a partial pressure of methane of about 0.15 (contact time about 0.2 second). Under these conditions, the deposition rate is about 50 microns per hour, and deposition is continued until the deposited pyrolytic carbon is about 100 microns thick. The coated boron carbide particles and the disks are then cooled, removed from the tube, and examined and tested. Specimens are cut from the disks as in Example II.

The density of the isotropic pyrolytic carbon is about 2.1 grams per cm. The Bacon anisotropy factor is about 1.1. The apparent crystallite size is about 130. A.

The coated boron carbide particles show increased resistance to thermal and irradiation stresses and have excellent vapor retention at temperatures where a fairly high vapor pressure of boron carbide exists. These coated neutron poison particles are considered well suited for use in nuclear energy applications. The specimens have an average fracture stress of about $30 \times 10^3$ p.s.i. and an average elastic moduli of about $2 \times 10^6$ p.s.i. The thermal conductivity is uniform in all directions and measures about $4 \times 10^{-2}$ cal./cm.-sec.-° C. The dimensional change after exposure to fast neutron irradiation of the level set forth in Example II is less than about 3% in the parallel directions. The isotropic pyrolytic structure is considered to have excellent mechanical and nuclear properties.

The invention provides a pyrolytic carbon structure having improved mechanical properties and having improved stability under fast neutron irradiation. Moreover, the invention provides a process for the deposition of this improved pyrolytic carbon which process, because of the relatively high amounts of total surface area accommodated within a given volume of coating region and because of the relatively high rates of pyrolytic carbon deposition which are achieved, and are due in part to the high methane concentration used, has especially appealing economic advantages over processes previously available for depositing dense pyrolytic carbon.

Various features of the invention are set forth in the following claims.

What is claimed is:
1. An improved pyrolytic carbon structure having good mechanical strength and excellent dimensional stability under prolonged exposure to high temperature and neutron irradiation, said carbon structure having an isotropic crystalline structure characterized by a Bacon anisotropy factor between about 1.0 and 1.3, has a density of at least about 1.8 grams per cc., has an apparent crystallite size of at least about 100 A., and is not optically active and is featureless when viewed metallurgically under polarized light.

2. An improved pyrolytic carbon structure in accordance with claim 1 wherein said Bacon anisotropy factor is between about 1.0 and 1.2 and said density is at least about 2.0 grams/cc.

3. In a process for producing a dense pyrolytic carbon structure having good mechanical strength and excellent dimensional stability under prolonged exposure to high temperatures and neutron irradiation, the steps comprising:

establishing a bed of substrate articles in an enclosure;
heating the substrate articles in said enclosure to a temperature in the range of about 1600° C. to about 2400° C.;
passing a gas stream mixture of an inert gas and a carbon compound of the class which decomposes pyrolytically to yield carbon into said enclosure to flow in contact past the surfaces of said substrate articles at a rate providing a contact time in the range of about 0.05 to about 0.3 second,
said temperature of heating and contact time determined by the flow rate of said gas stream together with the surface area size of said bed relative to the enclosure void volume being correlated so that said carbon compound decomposes to deposit isotropic carbon on said substrate surfaces, said isotropic carbon having a density of at least about 1.8 gr./cc., an apparent crystallite size of at least about 100 A. and is characterized by a Bacon anistoropy factor in the range of about 1.0 to about 1.3.

4. A process in accordance with claim 3 wherein said bed of articles includes small particle size articles adn said bed is established as a fluidized bed by flowing said stream upward through the enclosure.

5. A process in accordance with claim 3 wherein the gas stream is a mixture of a hydrocarbon gas and an inert gas.

6. A process in accordance with claim 3 wherein said gas stream is a mixture of methane and an inert gas.

7. A process in accordance with claim 6, wherein said heating is to a temperature between about 2000° C. and 2400° C.

8. A process in accordance with claim 6, wherein the size of said bed of articles is such that the total deposition surface area, measured in sq. cm., to the void volume, measured in cu. cm., of the region of the enclosure wherein deposition occurs is maintained at at least about 3 to 1.

9. A process in accordance with claim 6 wherein the gas stream contains between about 10 and about 50 volume percent methane.

10. A process in accordance with claim 4 wherein said heating maintains a deposition temperature between about 2000° C. and 2300° C., wherein said gas stream is a mixture of methane and helium at a pressure of about one atmosphere containing between about 10 and 50 volume percent methane, wherein the size of said bed of articles is such that the total deposition surface area, measured in sq. cm., to the void volume, measured in cu. cm., of the region of the enclosure wherein deposition occurs is maintained at at least about 5 to 1, and wherein the flow rate of said gas stream is such that the contact time is between about 0.05 second and about 0.3 second, the correlation of the abovementioned conditions being such that the isotropic carbon deposited has a Bacon anisotropy factor of below about 1.2, and a density of at least about 2.0 gm./cc.

References Cited

UNITED STATES PATENTS

| 3,298,921 | 1/1967 | Bokros et al. | 176—67 |
| 3,325,363 | 6/1967 | Goeddel et al. | 117—100I |

OTHER REFERENCES

Colligan and Galasso, Crystallography Structure of Vapor Deposited Carbon in Nature, vol. 190, No. 4776, pp. 621–22, May 13, 1961.

ALFRED L. LEAVITT, Primary Examiner

M. F. ESPOSITO, Assistant Examiner

U.S. Cl. X.R.

23—209.1; 117—100, 106, 226;176—82; 252—421